United States Patent
Henn et al.

(10) Patent No.: US 11,919,544 B2
(45) Date of Patent: Mar. 5, 2024

(54) METHOD AND DEVICE FOR OPERATING AN AUTOMATED VEHICLE

(71) Applicant: Robert Bosch GmbH, Stuttgart (DE)

(72) Inventors: Ruediger-Walter Henn, Weil der Stadt (DE); Tobias Mueller, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 307 days.

(21) Appl. No.: 17/140,568

(22) Filed: Jan. 4, 2021

(65) Prior Publication Data
US 2021/0206392 A1 Jul. 8, 2021

(30) Foreign Application Priority Data
Jan. 8, 2020 (DE) .......................... 102020200133.2

(51) Int. Cl.
*B60W 60/00* (2020.01)
*G05D 1/00* (2006.01)
*G05D 1/02* (2020.01)

(52) U.S. Cl.
CPC ....... *B60W 60/0027* (2020.02); *G05D 1/0088* (2013.01); *G05D 1/0276* (2013.01);
(Continued)

(58) Field of Classification Search
CPC ..... B60W 60/0027; B60W 2554/4041; B60W 2554/4044; B60W 2556/45;
(Continued)

(56) References Cited

U.S. PATENT DOCUMENTS

2002/0198660 A1* 12/2002 Lutter .................. G08G 1/0965
342/455
2015/0112570 A1* 4/2015 Schmudderich ...... B60W 50/14
(Continued)

FOREIGN PATENT DOCUMENTS

| DE | 102015003124 A1 | 9/2016 |
| DE | 102017219302 A1 | 5/2019 |
| DE | 102018122115 A1 * | 3/2020 |

OTHER PUBLICATIONS

Norm Sae J3016 Jun. 15, 2018, "Taxonomy and Definitions for Terms Related to Driving Automation Systems for On-Road Motor Vehicles," Sae International, 2018, pp. 1-35. <https://www.sae.org/standards/content/j3016_201806/> Downloaded Dec. 31, 2020.

*Primary Examiner* — Elaine Gort
*Assistant Examiner* — Ellis B. Ramirez
(74) *Attorney, Agent, or Firm* — NORTON ROSE FULBRIGHT US LLP; Gerard A. Messina

(57) ABSTRACT

A method and a device for operating an automated vehicle. The method includes a step of detecting surroundings data values, a step of determining positions and/or predicted movements of objects in the surroundings of the automated vehicle, a step of carrying out a first comparison of the surroundings data values and/or of the positions and/or of the predicted movements using an external server, a step of determining a driving strategy for the automated vehicle as a function of the positions and/or predicted movements of the objects and as a function of the first comparison, a step of carrying out a second comparison of the driving strategy using the external server, and a step of operating the automated vehicle as a function of the driving strategy and as a function of the second comparison.

6 Claims, 1 Drawing Sheet

(52) U.S. Cl.
CPC ............... *B60W 2554/4041* (2020.02); *B60W 2554/4044* (2020.02); *B60W 2556/45* (2020.02); *B60W 2756/10* (2020.02)

(58) Field of Classification Search
CPC ......... B60W 2756/10; B60W 2554/00; B60W 2556/50; B60W 2556/60; B60W 40/04; B60W 2554/40; G05D 1/0088; G05D 1/0276; G05D 1/0282; G05D 2201/0213
USPC .......... 701/25, 408, 411, 426, 436; 382/199, 382/216, 277, 284, 289, 296
See application file for complete search history.

(56) References Cited

U.S. PATENT DOCUMENTS

| | | | |
|---|---|---|---|
| 2016/0137203 A1* | 5/2016 | Mueller | B60W 40/09 701/36 |
| 2018/0180440 A1* | 6/2018 | Masuda | G01C 21/3453 |
| 2018/0211520 A1* | 7/2018 | Offenhaeuser | G08G 1/0141 |
| 2018/0314247 A1* | 11/2018 | Sun | B60W 30/00 |
| 2019/0005818 A1* | 1/2019 | Altinger | G08G 1/096791 |
| 2019/0041862 A1* | 2/2019 | Zaum | G01C 21/3461 |
| 2019/0047559 A1* | 2/2019 | Conde | G05D 1/0088 |
| 2019/0107399 A1* | 4/2019 | Kawauchi | G01S 19/23 |
| 2020/0051434 A1* | 2/2020 | Sasaki | H04W 4/46 |
| 2020/0074061 A1* | 3/2020 | Kim | B60W 40/08 |

* cited by examiner

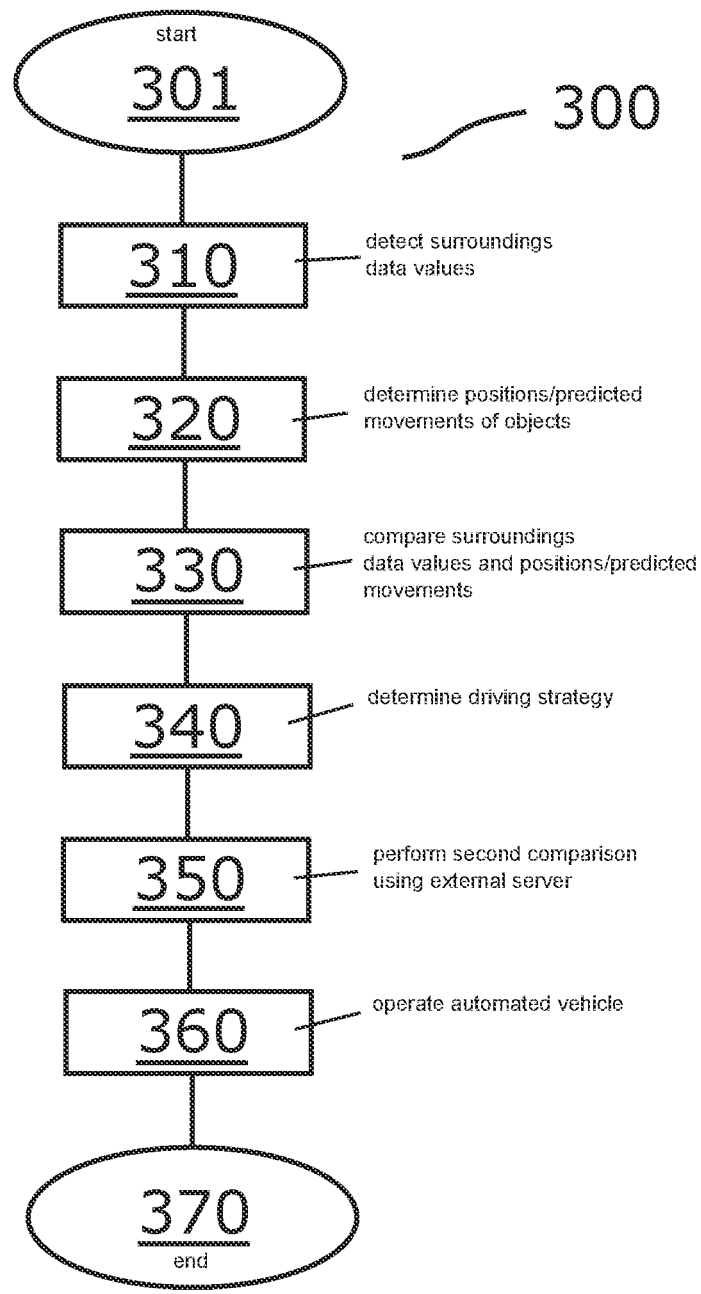

METHOD AND DEVICE FOR OPERATING AN AUTOMATED VEHICLE

CROSS REFERENCE

The present application claims the benefit under 35 U.S.C. § 119 of German Patent Application No. DE 102020200133.2 filed on Jan. 8, 2020, which is expressly incorporated herein by reference in its entirety.

FIELD

The present invention relates, among other things, to a method for operating an automated vehicle as a function of a predetermined driving strategy and/or as a function of a comparison of the driving strategy to an external server.

SUMMARY

The method according to an example embodiment of the present invention for operating an automated vehicle includes a step of detecting surroundings data values that represent the surroundings of the automated vehicle, a step of determining positions and/or predicted movements of objects in the surroundings of the automated vehicle as a function of the surroundings data values, and a step of carrying out a first comparison of the surroundings data values and/or of the positions and/or of the predicted movements to an external server, the external server including comparable surroundings data values and/or comparable positions and/or comparable predicted movements of the same objects. The method also includes a step of determining a driving strategy for the automated vehicle as a function of the positions and/or predicted movements of the objects and as a function of the first comparison, a step of carrying out a second comparison of the driving strategy using the external server, the external server including a comparable driving strategy, and a step of operating the automated vehicle as a function of the driving strategy and as a function of the second comparison.

An automated vehicle is understood to mean a vehicle that is designed according to one of SAE levels 1 through 5 (see SAE J3016 standard).

Detecting the surroundings data values is understood to mean a detection of the surroundings of the automated vehicle with the aid of a surroundings sensor system. A surroundings sensor system is understood to mean at least one video sensor and/or at least one radar sensor and/or at least one LIDAR sensor and/or at least one ultrasonic sensor and/or at least one further sensor that are/is designed to detect the surroundings of the automated vehicle in the form of surroundings data values. The surroundings sensor system is in particular designed to detect surroundings features in the surroundings (roadway patterns, traffic signs, lane markings, buildings, roadway boundaries, etc.) and/or traffic objects (vehicles, cyclists, pedestrians, etc.). In one specific embodiment, the surroundings sensor system includes, for example, a processing unit (processor, working memory, hard disk) with suitable software and/or is connected to such a processing unit, as the result of which these surroundings features may be detected and/or classified or associated.

Determining positions and/or predicted movements of objects in the surroundings of the automated vehicle as a function of the surroundings data values is understood to mean, for example, that relative positions of these objects with respect to the automated vehicle, for example in the form of vectors, and/or GPS coordinates of these objects, are determined. A predicted movement is understood to mean, for example, that an object (in the present case another vehicle, for example) that is situated ahead of the automated vehicle in the travel direction is situated at a distance from the automated vehicle when the rear side of this other vehicle is detected. In one possible specific embodiment, for determining the predicted movement, for example a map which is encompassed by the automated vehicle is used with the aid of a localization device and/or a navigation system. For example, a course of the traffic route on which the automated vehicle is situated may be incorporated for determining the predicted movement.

An external server is understood to mean, for example, an individual server or a combination of servers (cloud) or a so-called Multi-access Edge Computing (MEC) server.

Carrying out the first comparison is understood to mean that the surroundings data values and/or the positions and/or the predicted movements are transmitted by the automated vehicle to the external server with the aid of a transmitting unit and/or receiving unit, and compared by the external server to comparable surroundings data values and/or comparable positions and/or comparable predicted movements of the same objects. If this first comparison results in the occurrence of first deviations that exceed predefined first limiting values, either errors in the process sequence of the automated vehicle or errors in the process sequence of the external server may be established. In this regard, the process sequence refers to the determination of positions and/or predicted movements of objects in the surroundings of the automated vehicle.

Carrying out the second comparison is understood to mean that the driving strategy is transmitted by the automated vehicle to the external server with the aid of a transmitting unit and/or receiving unit, and is compared to a comparable driving strategy by the external server. If this second comparison results in the occurrence of second deviations that exceed predefined second limiting values, either errors in the process sequence of the automated vehicle or errors in the process sequence of the external server may be established. In this regard, the process sequence refers to the determination of a driving strategy for the automated vehicle.

The method according to the present invention may advantageously achieve the object that a safe and reliable operation of the automated vehicle is ensured and these errors may be understood, even for errors possibly occurring in individual processing steps for the automated driving. This object may be achieved with the aid of the example method according to the present invention, in that surroundings data values detected on the vehicle side and/or positions determined on the vehicle side and/or predicted movements of objects in the surroundings of the automated vehicle and/or a driving strategy for the automated vehicle determined on the vehicle side are/is compared to an external server and thus checked for errors. Individual function blocks are thus plausibility-checked or validated. This allows the best possible representation of the automated driving, even in complex traffic areas (urban areas, etc.).

The driving strategy and/or the comparable driving strategy preferably include(s) a trajectory and/or a trajectory corridor.

Operating the automated vehicle as a function of the SAE level in which the particular vehicle is operated is understood to mean, for example, traveling the trajectory and/or the trajectory corridor with the aid of an automated transverse and/or longitudinal control and/or carrying out safety-relevant driving functions. A trajectory corridor is understood to mean a driving path that is actually traveled, corresponding to the width of the automated vehicle.

Determining a driving strategy for the automated vehicle as a function of the positions and/or predicted movements of the objects and as a function of the first comparison is understood to mean, for example, that the driving strategy is determined as a function of the positions and/or predicted movements of the objects when the first comparison leads to the result that the first limiting values are not exceeded. Otherwise, when the first limiting values are exceeded, the driving strategy is replaced by an emergency driving strategy, for example. The emergency driving strategy may encompass, for example, safely parking the automated vehicle as quickly as possible in a secure area (parking area, roadside, etc.).

Operating the automated vehicle as a function of the driving strategy and as a function of the second comparison is understood to mean, for example, that the automated vehicle is operated as a function of the driving strategy when the second comparison leads to the result that the second limiting values are not exceeded. Otherwise, when the second limiting values are exceeded, the automated vehicle is operated as a function of the emergency driving strategy, for example. In one specific embodiment, the external server transmits the comparable driving strategy or the emergency driving strategy (as the second comparison) to the automated vehicle when the second limiting values are exceeded.

The surroundings data values and/or the positions and/or the predicted movements and/or the driving strategy for carrying out the first or second comparison, in each case together with information concerning measuring errors and/or accuracy values and/or trust values and/or probability values, are preferably transmitted to the external servers.

The comparable surroundings data values and/or the comparable positions and/or the comparable predicted movements are preferably detected by at least one further vehicle in the surroundings and/or by at least one infrastructure sensor system in the surroundings and transmitted to the external server.

In one preferred specific embodiment of the present invention, the corresponding data of numerous different sources, for example an infrastructure sensor system (traffic monitoring camera, etc.) and multiple vehicles which include a surroundings sensor system in each case, are available to the external server. This allows a preferably complete and error-free surroundings model for the surroundings of the automated vehicle.

All exchanged data are preferably transmitted between the automated vehicle and the external server with the aid of a scalable block chain method.

A block chain is understood to mean, for example, a continuously expandable list of data sets, referred to as "blocks," these data sets being linked together with the aid of cryptographic methods. Each block typically contains a cryptographically secure hash value of the preceding block, a time stamp, and transaction data.

The device according to an example embodiment of the present invention, in particular a control unit, is configured to carry out all steps of the method for operating the automated vehicle according to one of the method claims.

In one possible specific embodiment of the present invention, the device includes a processing unit (processor, working memory, hard disk) and suitable software for carrying out the method according to one of the method claims. For this purpose, the device includes, for example, a transmitting unit and/or receiving unit that are/is designed to exchange data values with an external server. In one alternative specific embodiment, the device is connected to a transmitting device and/or receiving device with the aid of a suitable interface. In addition, the device includes an interface for exchanging surroundings data values with a surroundings sensor system. Furthermore, the device includes an interface for operating the automated vehicle, with the aid of which, for example, appropriate signals for a transverse and/or longitudinal control may be provided.

Moreover, a computer program is provided in accordance with an example embodiment of the present invention that includes commands which prompt a computer to carry out a method according to one of the method claims when the computer program is executed by the computer. In one specific embodiment of the present invention, the computer program corresponds to the software that is encompassed by the device.

Furthermore, a machine-readable memory medium on which the computer program is stored is also provided in accordance with an example embodiment of the present invention.

Advantageous refinements of the present invention are described herein.

BRIEF DESCRIPTION OF THE DRAWING

Exemplary embodiments of the present invention are illustrated in the FIGURE and explained in greater detail in the description below.

FIG. 1 shows one exemplary embodiment of the method according to the present invention for determining emergency trajectories in the form of a flowchart.

DETAILED DESCRIPTION OF EXAMPLE EMBODIMENTS

FIG. 1 shows one exemplary embodiment of a method 300 for operating 360 an automated vehicle, in accordance with the present invention.

Method 300 starts in step 301.

Surroundings data values that represent the surroundings of the automated vehicle are detected in step 310.

Positions and/or predicted movements of objects in the surroundings of the automated vehicle are determined as a function of the surroundings data values in step 320.

A first comparison of the surroundings data values and/or of the positions and/or of the predicted movements is carried out in step 330 using an external server, the external server including comparable surroundings data values and/or comparable positions and/or comparable predicted movements of the same objects.

A driving strategy for the automated vehicle is determined in step 340 as a function of the positions and/or predicted movements of the objects and as a function of the first comparison.

A second comparison of the driving strategy using the external server is carried out in step 350, the external server including a comparable driving strategy.

The automated vehicle is operated in step 360 as a function of the driving strategy and as a function of the second comparison.

Method 300 ends in step 370.

What is claimed is:

1. A method for operating an automated vehicle, the method comprising:
   detecting surroundings data values that represent surroundings of the automated vehicle;

determining positions and predicted movements of objects in the surroundings of the automated vehicle as a function of the surroundings data values;

carrying out a first comparison of the surroundings data values and of the positions and of the predicted movements using an external server, the external server including comparable surroundings data values and comparable positions and comparable predicted movements of the same objects;

determining a driving strategy for the automated vehicle as a function of the positions and the predicted movements of the objects and as a function of the first comparison;

carrying out a second comparison of the driving strategy using the external server, the external server encompassing a comparable driving strategy; and operating the automated vehicle as a function of the driving strategy and as a function of the second comparison;

wherein, for carrying out the first and second comparison, the surroundings data values and the positions and the predicted movements and the driving strategy, in each case together with information concerning measuring errors and accuracy values and trust values and probability values, are transmitted to the external server, wherein determining a driving strategy for the automated vehicle as a function of the positions and/or predicted movements of the objects and as a function of the first comparison provides that the driving strategy is determined as a function of the positions and/or predicted movements of the objects when the first comparison leads to the result that first limiting values are not exceeded, and wherein when the first limiting values are exceeded, the driving strategy is replaced by an emergency driving strategy, the emergency driving strategy, including safely parking the automated vehicle in a roadside or a parking area, and wherein operating the automated vehicle as a function of the driving strategy and as a function of the second comparison provides that the automated vehicle is operated as a function of the driving strategy when the second comparison leads to the result that second limiting values are not exceeded, and wherein when the second limiting values are exceeded, the automated vehicle is operated as a function of the emergency driving strategy, and wherein the external server transmits the emergency driving strategy to the automated vehicle when the second limiting values are exceeded.

2. The method as recited in claim 1, wherein the driving strategy and/or the comparable driving strategy includes a trajectory and/or a trajectory corridor.

3. The method as recited in claim 1, wherein the comparable surroundings data values and the comparable positions and the comparable predicted movements, are detected by at least one further vehicle in the surroundings and transmitted to the external server and/or by at least one infrastructure sensor system in the surroundings and transmitted to the external server.

4. The method as recited in claim 1, wherein all exchanged data are transmitted between the automated vehicle and the external server using a scalable block chain method.

5. A control apparatus to operate an automated vehicle, comprising:
a control unit configured to perform the following:
  detecting surroundings data values that represent surroundings of the automated vehicle;
  determining positions and predicted movements of objects in the surroundings of the automated vehicle as a function of the surroundings data values;
  carrying out a first comparison of the surroundings data values and of the positions and of the predicted movements using an external server, the external server including comparable surroundings data values and comparable positions and comparable predicted movements of the same objects;
  determining a driving strategy for the automated vehicle as a function of the positions and the predicted movements of the objects and as a function of the first comparison;
  carrying out a second comparison of the driving strategy using the external server, the external server encompassing a comparable driving strategy; and
  operating the automated vehicle as a function of the driving strategy and as a function of the second comparison;
  wherein, for carrying out the first and second comparison, the surroundings data values and the positions and the predicted movements and the driving strategy, in each case together with information concerning measuring errors and accuracy values and trust values and probability values, are transmitted to the external server,
  wherein determining a driving strategy for the automated vehicle as a function of the positions and/or predicted movements of the objects and as a function of the first comparison provides that the driving strategy is determined as a function of the positions and/or predicted movements of the objects when the first comparison leads to the result that first limiting values are not exceeded, and wherein when the first limiting values are exceeded, the driving strategy is replaced by an emergency driving strategy, the emergency driving strategy, including safely parking the automated vehicle in a roadside or a parking area, and
  wherein operating the automated vehicle as a function of the driving strategy and as a function of the second comparison provides that the automated vehicle is operated as a function of the driving strategy when the second comparison leads to the result that second limiting values are not exceeded, and wherein when the second limiting values are exceeded, the automated vehicle is operated as a function of the emergency driving strategy, and wherein the external server transmits the emergency driving strategy to the automated vehicle when the second limiting values are exceeded.

6. A non-transitory machine-readable memory medium, on which is stored a computer program, which is executable by a processor, comprising:
a program code arrangement having program code for operating an automated vehicle, by performing the following:
  detecting surroundings data values that represent surroundings of the automated vehicle;
  determining positions and predicted movements of objects in the surroundings of the automated vehicle as a function of the surroundings data values;
  carrying out a first comparison of the surroundings data values and of the positions and of the predicted movements using an external server, the external server including comparable surroundings data values and comparable positions and comparable predicted movements of the same objects;
determining a driving strategy for the automated vehicle as a function of the positions and the predicted movements of the objects and as a function of the first comparison;
carrying out a second comparison of the driving strategy using the external server, the external server encompassing a comparable driving strategy; and
operating the automated vehicle as a function of the driving strategy and as a function of the second comparison;
wherein, for carrying out the first and second comparison, the surroundings data values and the positions and the predicted movements and the driving strategy, in each case together with information concerning measuring errors and accuracy values and trust values and probability values, are transmitted to the external server,
wherein determining a driving strategy for the automated vehicle as a function of the positions and/or predicted movements of the objects and as a function of the first comparison provides that the driving strategy is determined as a function of the positions and/or predicted movements of the objects when the first comparison leads to the result that first limiting values are not exceeded, and wherein when the first limiting values are exceeded, the driving strategy is replaced by an emergency driving strategy, the emergency driving strategy, including safely parking the automated vehicle in a roadside or a parking area, and
wherein operating the automated vehicle as a function of the driving strategy and as a function of the second comparison provides that the automated vehicle is operated as a function of the driving strategy when the second comparison leads to the result that second limiting values are not exceeded, and wherein when the second limiting values are exceeded, the automated vehicle is operated as a function of the emergency driving strategy, and wherein the external server transmits the emergency driving strategy to the automated vehicle when the second limiting values are exceeded.

* * * * *